United States Patent [19]

Harvey

[11] Patent Number: 4,497,457
[45] Date of Patent: Feb. 5, 1985

[54] LINE HOLDER
[76] Inventor: William O. Harvey, 1240 E. 26th Rd., Cadillac, Mich. 49601
[21] Appl. No.: 524,758
[22] Filed: Aug. 18, 1983
[51] Int. Cl.³ ...................... B65H 75/34; B65H 75/36
[52] U.S. Cl. .................................... 242/96; 242/85.1; 24/115 F; 24/129 A
[58] Field of Search ............ 242/85.1, 96, 125, 125.1, 242/125.2, 125.3, 157 C; D8/358, 359; 43/54.1, 25.2; 244/155 A, 155 R; 441/69; 114/253, 254; 24/115 F, 129 A

[56] References Cited
U.S. PATENT DOCUMENTS

| D. 250,746 | 1/1979 | Powell | D8/358 |
|---|---|---|---|
| 1,016,783 | 2/1912 | Schmucker | 242/85.1 |
| 1,910,597 | 5/1933 | Elliott | 242/85.1 |
| 2,204,939 | 6/1940 | Lyons | 242/85.1 |
| 3,832,746 | 9/1974 | Korsgaard | 242/85.1 X |
| 3,901,458 | 8/1975 | Kuncz | 242/85.1 |
| 4,261,529 | 4/1981 | Sandberg | 242/85.1 |

FOREIGN PATENT DOCUMENTS
447636  6/1936  United Kingdom .

Primary Examiner—Stuart S. Levy
Assistant Examiner—Leo J. Peters
Attorney, Agent, or Firm—Michael L. Bauchan

[57]         ABSTRACT

A line holder is provided which permits using one hand to selectively engage and disengage a line as it is unwound from a reel. A line lock in the form of a hook assembly is secured to the reel so that angular movement of the reel to first and second positions selectively engages the hook assembly with the line to prevent uncoiling the line and selectively moving the reel to the second and first positions releases the hooked line to permit uncoiling the line. A base is provided for mooring the line to a fixed position.

7 Claims, 9 Drawing Figures

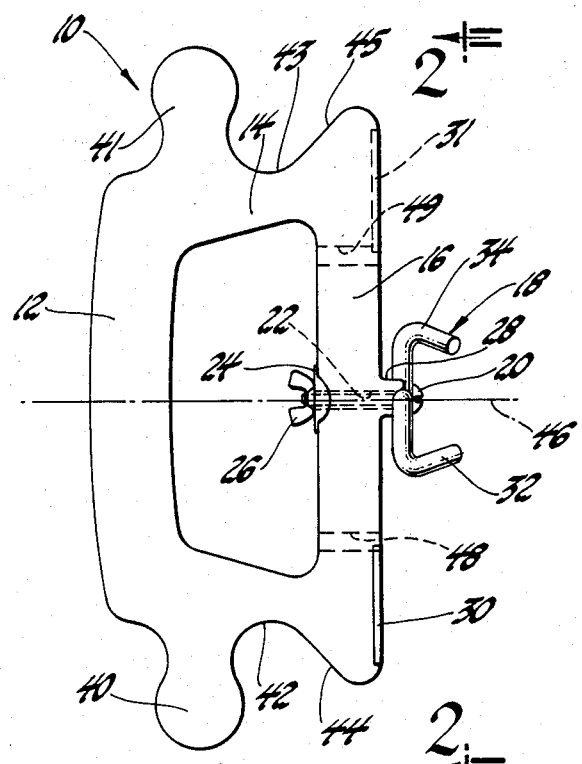
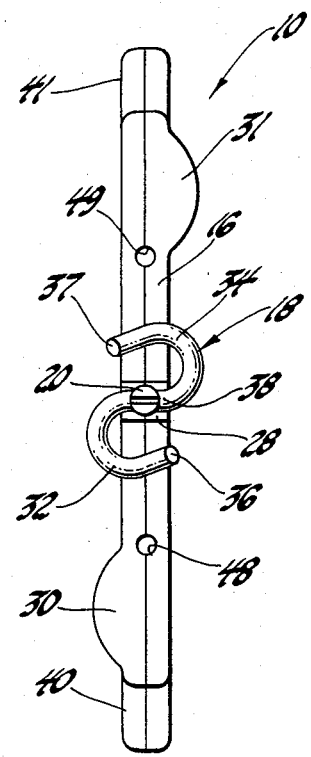
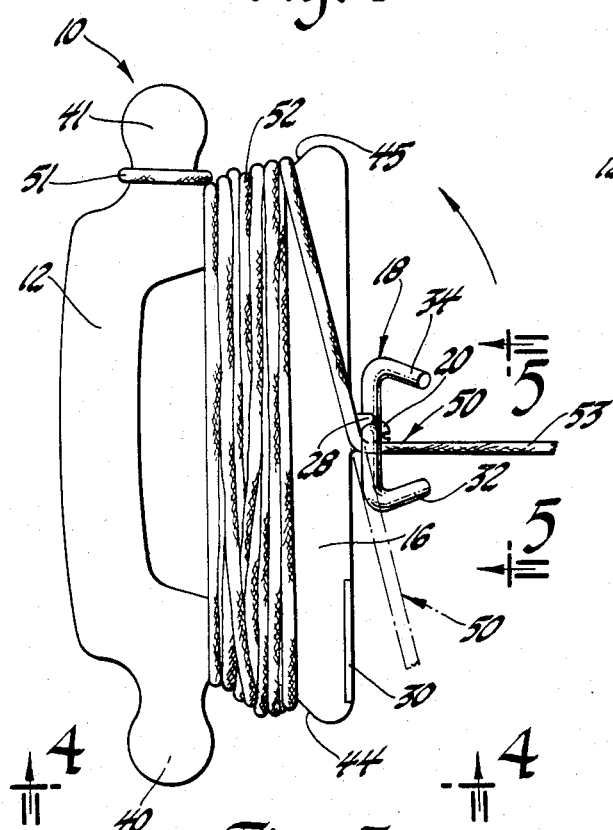
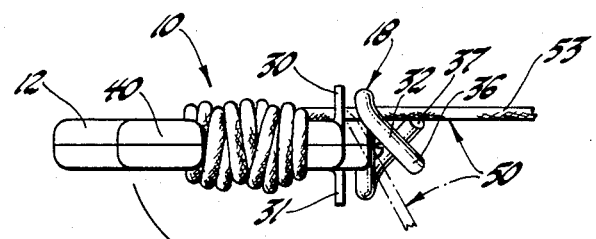
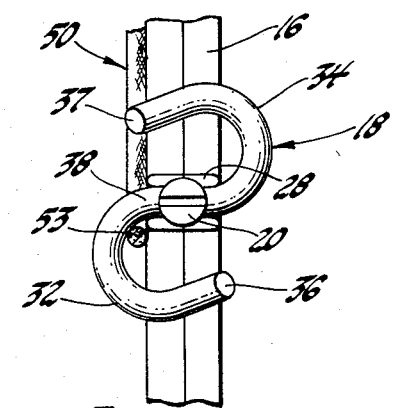

LINE HOLDER

BACKGROUND OF THE INVENTION

Lines are in common usage which are made of numerous materials, including natural materials such as cotton and wool and synthetic materials such as nylon and steel. Where the line usage includes a person holding a line in tension there have been numerous devices constructed to store the line and to facilitate holding the line in tension by means of holding a comfortable handgrip.

Some devices such as Kuncz U.S. Pat. No. 3,901,458, a U.S. patent issued Aug. 26, 1975, provide a handgrip and serve solely to store lines.

Some devices such as Powell, U.S. Pat. No. Des. 250,746, a U.S. design patent issued Jan. 9, 1979, and Latimer No. 447,636, a British patent issued June 18, 1936 provide apparatus for both storing a line and maintaining a line in tension but they do not permit simple one-handed operation by which a line in storage on the device can be selectively released as it is being pulled off the storage reel.

It is therefore an object of this invention to provide apparatus for storing a line and selectively adjusting the line extending from the apparatus while the line is in tension.

It is a further object of this invention to provide a line handle which stores the line and while being held by one hand selectively engages and disengages the line so as to adjust the amount of line being pulled from the handle.

It is a further object of this invention to provide a line handle which stores a line, permits one-handed selective engaging and disengaging of the line to adjust the length of the line extending from the handle and which permits mooring the line to a fixed place while maintaining the line in tension.

The foregoing and other objects of the invention will become apparent from the accompanying drawings and descriptions.

SUMMARY OF THE INVENTION

This invention is of a unique line handle which incorporates a handgrip and line reel in a single unit. Two hooks axially mounted on the reel selectively engage and disengage the line as it is pulled off the reel. The line handle may be controlled with a single hand. After removing the hooks the handle can be secured to a rigidly mounted base to moor the line.

DESCRIPTION OF THE PREFERRED EMBODIMENT

The invention is best understood by reference to the accompanying description and drawings in which:

FIG. 1 is a side view of a line handle embodying the principles of the subject invention.

FIG. 2 is a front view of the line handle in FIG. 1 taken along lines 2—2.

FIG. 3 is a side view of the line handle in FIG. 1 with a line installed on the handle.

FIG. 4 is an end view of the line handle in FIG. 3 taken along the lines 4—4.

FIG. 5 is a partial front view of the line handle in FIG. 3 taken along the lines 5—5.

Figure 6:
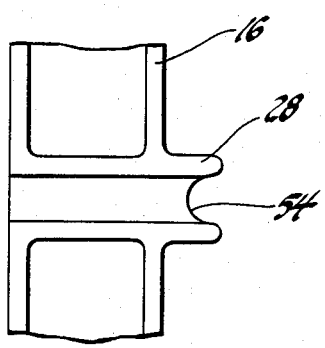
FIG. 6 is a partial side view of the line handle in FIG. 1 with parts removed.

A line handle 10 embodying the principles of the subject invention is illustrated in FIG. 1. The line handle 10 in large part is compromised of a single unit which includes a handgrip 12, a reel 14, and a line lock support 16 which supports a hook assembly 18. The handgrip 12, reel 14, and line lock support 16 may all be formed of a single piece of material or a combination of natural or synthetic materials. In some applications, particularly when used in sailing, it is desirable that the line handle 10 be made of a buoyant material which floats. Depending upon the application, it may be desired to make the line handle 10 out of laminated wood, a single piece of wood, nylon, aluminum, or two pieces of plastic which may be made into a single piece such as through vibration welding where surfaces join.

As shown in FIG. 1, the hook assembly 18 in the preferred embodiment is formed of a sturdy metal which resists rusting, such as galvanized steel or stainless steel, and is secured to the line lock support 16 by means of a bolt 20 extending through a mounting hole 22 and a washer 24 where it is secured by a wing nut 26. The line lock support 16 includes a saddle 28 into which the hook assembly 18 is mounted and held a predetermined distance in front of the reel 14.

The portion of the reel 14 closest to the hook assembly 18 includes two line guide flanges 30 and 31 best illustrated in FIG. 2. FIG. 2 also illustrates how the hook assembly 18 includes a first hook 32 and a second hook 34 formed of a single rod in the shape of a "S" with the respective ends 36 and 37 in a different plane than the center 38 of the hook assembly 18 which is bolted to the saddle 28, which as shown in FIG. 2 has a square cross-section.

For reasons which will later become apparent, the reel 14 includes knobs 40 and 41, valleys 42 and 43, and inclined surfaces 44 and 45 which in the illustrated embodiment are at approximately a 45° angle to the reel axis 46 shown as the centerline through bolt 20. The line lock support 16 also includes mounting holes 48 and 49.

As shown in FIG. 3, a line 50 is installed on line handle 10 by tying one end 51 of the line 50 around knob 41. The line 50 is then wound on coil 52 around the reel 14, which cradles the coil 52 in the valleys 42 and 43 between the knobs 40 and 41 and the inclined surfaces 44 and 45. The other end 53 in FIG. 3 extends to the right in FIG. 3 as if under a tensile force. The end 53 of the line 50 passes between the reel 14 and hook assembly 18 and passes through the hook 32 as shown in FIG. 5. Persons versed in the art will appreciate that holding handgrip 12 to pull against the tensile force in line 50 pulls line 50 in FIG. 3 tighter against inclined surface 45. It is thus apparent that no matter how hard line 50 is pulled the hook assembly 18 serves to lock the line and prevent uncoiling the line.

As shown in FIG. 4 the ends 36 and 37 of the hook assembly 18 are inclined at substantially a 45° angle to the plane in which the center 38 of the hook assembly 18 is located. It is thus apparent that if the line handle 10 is turned sideways a predetermined angle so the line 50 does not extend through the hook 32, which is illustrated in dashed lines in FIG. 4, and if the line handle 10 is then tilted so the line 50 comes out from between the hook assembly 18 and reel 14 as illustrated in dashed lines in FIG. 3, the line can be released from the hook assembly 18 so it is free to be pulled axially from the reel 14 substantially parallel to the reel axis 46.

For purposes of illustration an arrow is depicted in FIG. 4 showing the direction in which the line handle 10 is to be moved relative to the line 50 in order to remove the line 50 from within the hook 32 by grasping the handgrip 12 so as to angularly change the position of the reel axis 46. Similarly, an arrow is illustrated in FIG. 3 to show the angular movement of the line handle 10 which is required to remove the line 50 from between the hook assembly 18 and the reel 14.

When line 50 is in tension and not engaged by one of the hooks 32 or 34 it uncoils from the reel 14 by being pulled substantially parallel to the reel axis 46.

By using a single hand on the handgrip 12 a person can selectively engage and disengage the line 50 and the hook assembly 18, which serves as a line lock to keep the line 50 locked in a position. To lock the line the operator while grasping handgrip 12 tilts the reel 14 in the angular direction illustrated in FIG. 3 by the arrow 20 so as to hold the line 50 against inclined surface 45 and position line 50 between hook assembly 18 and the reel 14. By angularly moving reel 14 to this first position the line 50 is stopped from uncoiling. However, in the first position it is held solely against the inclined surface 45 and if the operator angularly returned reel 14 to the position shown in solid lines in FIG. 3 line 50 would continue to uncoil. Therefore once the operator has stopped uncoiling line 50 by angularly tilting reel 14 in the direction illustrated by the arrow in FIG. 3 to the first position the operator then angularly moves the reel 14 to the second position illustrated by the arrow in FIG. 4 so the line 50 passes between the hook assembly 18 and the reel 14 and is adjacent the saddle 28 of the line lock support 16. The operator then tilts reel 14 to the position illustrated in FIG. 3 by moving it in the direction opposite the arrow in FIG. 3 and tilts reel 14 angularly in the direction opposite the arrow in FIG. 4 so the line 50 is engaged by hook 32 as illustrated in solid lines in FIGS. 3, 4 and 5.

As persons versed in the art will appreciate hooks 32 and 34 curve in the same direction relative to bolt 20. Therefore the operator can engage line 50 when the free end 53 of line 50 is pulled against inclined surface 45 or an additional ½ of a coil of line 50 can be removed from reel 14 so the free end 53 is pulled against inclined surface 44 and line 50 is engaged by hook 34 instead of hook 32.

Line guide flanges 30 and 31 are provided so that when line 50 is pulled axially off reel 14 it does not accidentally engage one of the hooks 32 or 34. Line guide flanges 30 and 31 guide the uncoiling line 50 outward away from hooks 32 and 34 when it is allowed to freely unwind.

As shown in FIG. 6 the line lock support 16 has a relatively deep notch 54 in the saddle 28 so as to prevent hook assembly 18 rotating in the saddle 28 even though a rotational force is applied on the hook assembly 18 by the line 50 tending to rotate hook assembly 18 about bolt 20.

Figure 7:
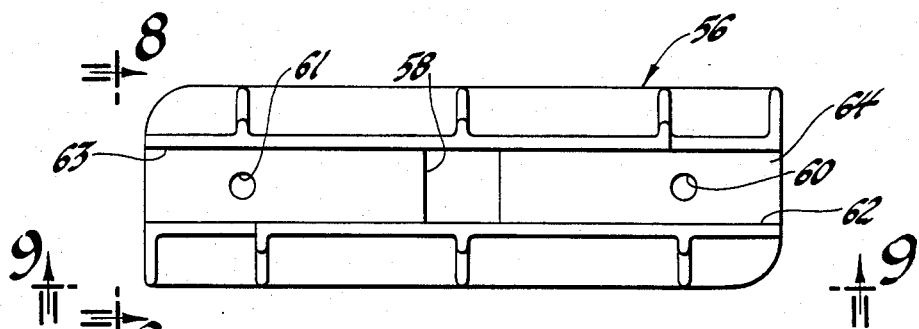
FIG. 7 is a top view of a mounting base.
Figure 8:
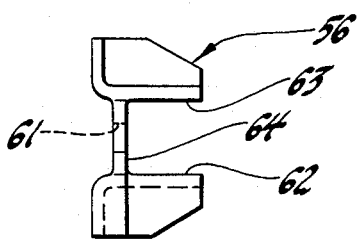
FIG. 8 is an end view of the mounting base in FIG. 7.
Figure 9:
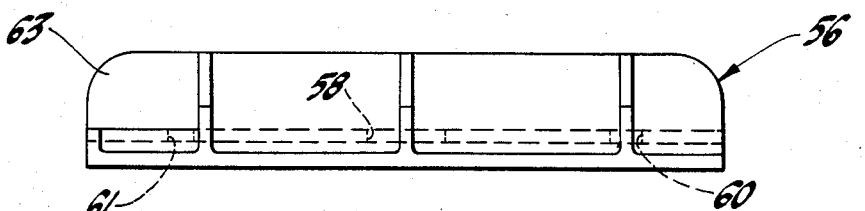
FIG. 9 is a side view of the mounting base in FIG. 7.

As shown in FIG. 7, a base 56 is provided to use line handle 10 as a mooring by removing hook assembly 18 and inserting saddle 28 through a hole 58 in the base 56. Mounting holes 60 and 61 are provided in the base 56 to a line with mounting holes 48 and 49 in the reel 14 so that the reel 14 can be bolted to base 56. Base 56 has sidewalls 62 and 63 perpendicular to a floor 64 so that the sidewalls 62 and 63 hold reel 14 so the reel axis 46 is perpendicular to floor 64. As shown in FIG. 7, sidewalls 62 and 63 do not extend the full length of the base 56 to provide room for line guide flanges 30 and 31. It is thus apparent that line handle 10 can be used to moor line 50 to a fixed position by securing base 56 to that fixed position and attaching reel 14 to the base 56.

Persons versed in the art will appreciate that various modifications may be made of the subject apparatus without departing from the spirit of the invention. One such modification would be the reversal of the direction in which hooks 32 and 34 extend from bolt 20 and placement of line guide flanges 30 and 31 on opposite sides of reel 14 so as to permit winding line 50 around reel 14 in the opposite direction from that illustrated.

What is claimed is:

1. Apparatus for storing and selectively dispensing a line comprising, in combination, a reel for storing a predetermined diameter line in a coil substantially defined by a reel axis, reel support means for supporting said reel and angularly moving said reel so as to change the position of said reel axis; and a line control means secured to said reel for selectively engaging and disengaging said line so as to selectively dispense said line from said reel while said line uncoils from said reel in a certain direction, said line control means including two opposed hooks which curve in the same direction and a hook support which supports said hook a predetermined distance from said reel which is greater than said line diameter so as to permit said line extending between said hooks and said reel, said hooks engaging said line so as to prevent uncoiling said line from said reel by angularly moving said reel to a first position in which said line cannot uncoil from said reel and then angularly moving said reel to a second position in which one of said hooks engages said line by said line extending between said reel and said one hook and through said one hook in said certain direction, thereby preventing uncoiling of said line when said reel axis substantially points in said certain direction, said one hook disengaging said line so as to permit uncoiling said line from said reel by angularly moving said reel to said second position and then to said first position, thereby permitting uncoiling of said line when said reel axis substantially points in said certain direction.

2. The apparatus of claim 1 in which said hooks support includes at least one line guide flange proximate said reel for guiding said line away from said hook so as to prevent said line engaging said hooks as said line uncoils unless said reel is first moved to said first position and then to said second position.

3. A line handle comprising, in combination, a handgrip, storage means attached to said handgrip for storing a line substantially in a coil defined by an axis which extends from said handgrip in a predetermined direction, a line lock including at least one hook secured to said storage means for selectively controlling the length of said line extending from said coil in said predetermined direction substantially parallel to said axis, said hook being positioned proximate said axis and spaced from said storage means a predetermined distance parallel to said axis in said predetermined direction so that when a coiled line on said storage means is uncoiled by being pulled from said coil away from said handgrip substantially in said predetermined direction which is substantially parallel to said axis said uncoiling line extends proximate said hook and may be selectively engaged and disengaged by a hook in said line lock by angularly tilting said storage means in one or more predetermined angular directions relative to said predetermined direction so as to selectively control the length of said line pulled from said storage means and permit maintaining said line in a state of tension solely by holding said handgrip while said line extends substantially in said predetermined direction substantially on said coil axis.

4. A line handle comprising, in combination, a handgrip having two ends defined by a handgrip axis and being adapted for grasping by a hand between said ends; a reel defined by a reel axis for storing a coiled line in a coil substantially on said reel axis, said reel axis being substantially perpendicular to said handgrip axis and extending from said handgrip axis in a predetermined direction, said reel including projections which keep said coiled lines spaced a predetermined distance in said predetermined direction from said handgrip so as to enable a hand to grasp said handgrip when said coiled line is on said reel; a line lock secured to said reel opposite said handgrip at a predetermined distance in said predetermined direction from said reel for selectively engaging and disengaging said line as said line is pulled axially from said coil away from said handgrip substantially in said predetermined direction parallel to said reel axis, said line lock including at least one hook for engaging said line as said line uncoils from said line storage means substantially in said predetermined direction parallel to said reel axis, said hook being secured to said reel substantially on said reel axis and positioned so as to engage said line when said reel is moved in a predetermined angular manner relative to said predetermined direction and to disengage said line when said line storage means is moved in a second predetermined angular manner relative to said predetermined direction whereby when a tensile force pulls said line off said reel substantially in said predetermined direction said line may be selectively dispensed from said reel by grasping said handgrip and selectively engaging and disengaging said line with one of said hooks by manipulating said handgrip.

5. Apparatus for storing and selectively dispensing a line comprising, in combination, a reel for storing a line in a coil substantially defined by a reel axis; reel support means secured to said reel substantially on said reel axis on one side of said reel for supporting said reel and angularly moving said reel so as to change the position of said reel axis; and line control means secured to said reel proximate said reel axis and on the side of said reel opposite said reel support means, said line control means being spaced a predetermined distance and a predetermined direction from said reel and including at least one hook secured to said reel for selectively engaging and disengaging said line so as to selectively dispense said line from said reel while said line uncoils from said reel in said predetermined direction, said hook engaging said liine so as to prevent uncoiling said line from said reel by angularly moving said reel to a first position in which said line cannot uncoil from said reel and then angularly moving said reel to a second position in which said hook engages said line, thereby preventing uncoiling of said line when said reel axis substantially points in said predetermined direction, said hook disengaging said line so as to permit uncoiling said line from said reel by angularly moving said reel to said second position and then to said first position, thereby permitting uncoiling of said line when said reel axis substantially points in said predetermined direction.

6. The apparatus of claim 5 in which said line control means comprises two hooks, each hook having one secured end connected to said reel and one free end at a predetermined angle to said reel axis, said free ends being on opposite sides of said reel axis whereby one of said hooks can selectively engage said line as said line unwinds from one side of said reel axis and the other of said hooks can selectively engage said line as said line unwinds from the other side of said reel axis, thereby facilitating selective dispensing of a line by grasping said handle with one hand and angularly moving said handle so each of said hooks selectively engage said line.

7. A line holder for selectively dispensing and mooring a line comprising, in combination, a reel for holding a line in a coil defined by an axis and from which a line may be uncoiled axially by pulling said line in a certain direction parallel to said axis, a handle for holding said reel, at least one detachable hook secured to said reel in said certain direction from said reel whereby uncoiling said line from said reel causes said uncoiling line to pass on all sides of said hook, a hook support for securing said hook to said reel and for supporting said hook at a predetermined distance from said reel so as to permit passing said line between said reel and said hook and extending said line through said hook in said certain direction whereby said hook may selectively engage said line by angularly moving said reel to a first position in which said line cannot uncoil from said reel and then angularly moving said reel to a second position in which said line engages said hook by said line passing between said hook and said reel and extending through said hook in said certain direction and said hook selectively disengages said line by angularly moving said reel to said second position and then to said first position so as to remove said line from said hook and to remove said line from between said hook and said reel so as to permit said line to uncoil from said reel, and a base for receiving said hook support and rigidly securing said reel to said base when said hook is removed from said hook support whereby said line may be rigidly moored to said base by removing said hook from said reel and securing said reel to said base.

* * * * *

UNITED STATES PATENT AND TRADEMARK OFFICE
CERTIFICATE OF CORRECTION

PATENT NO. : 4,497,457

DATED : 02/05/85

INVENTOR(S) : WILLIAM O. HARVEY

It is certified that error appears in the above-identified patent and that said Letters Patent is hereby corrected as shown below:

Column 2, Line 6, "compromised" should read ---comprised---.
Column 4, Line 45, "hooks" should read ---hook---.
Column 5, Line 56, "liine" should read ---line---.

Signed and Sealed this

Eleventh Day of June 1985

[SEAL]

*Attest:*

DONALD J. QUIGG

*Attesting Officer*  *Acting Commissioner of Patents and Trademarks*